United States Patent [19]
Niwa

[11] Patent Number: 5,229,950
[45] Date of Patent: Jul. 20, 1993

[54] NUMERICAL CONTROL UNIT
[75] Inventor: Tomomitsu Niwa, Aichi, Japan
[73] Assignee: Mitsubishi Denki K.K., Tokyo, Japan
[21] Appl. No.: 680,894
[22] Filed: Apr. 5, 1991
[30] Foreign Application Priority Data
  Apr. 9, 1990 [JP] Japan ................. 2-93543
[51] Int. Cl.$^5$ ............... G06F 15/46; G05B 19/403
[52] U.S. Cl. ........................ 364/474.23; 364/192
[58] Field of Search .......... 364/188, 189, 191, 192, 364/474.22–474.28, 474.36; 318/568.1

[56] References Cited
U.S. PATENT DOCUMENTS

| | | | |
|---|---|---|---|
| 4,501,998 | 2/1985 | Nozawa et al. | 364/141 |
| 4,587,608 | 5/1986 | Kishi et al. | 364/474.23 |
| 4,591,968 | 5/1986 | Nozawa et al. | 364/474.23 |
| 4,890,234 | 12/1989 | Tanaka et al. | 364/474.23 |
| 5,028,923 | 7/1991 | Seki et al. | 364/474.23 |

FOREIGN PATENT DOCUMENTS 56-168223 12/1981 Japan .
61-46846 -10/1986 Japan .
62-267804 11/1987 Japan .

*Primary Examiner*—Jerry Smith
*Assistant Examiner*—Thomas E. Brown
*Attorney, Agent, or Firm*—Sughrue Mion Zinn Macpeak & Seas

[57] ABSTRACT

A numerical control system for machining a workpiece including a reader for reading a machining control program for the workpiece, a control device for supplying a control signal to a machine tool for the workpiece, and a storage device disposed internal or external to the control device, for storing a conversion table for converting a first character string read from the program into a second character string representing a command. The control device operates in response to the reader reading the first character string to supply the control signal to the machine tool in accordance with the command of the second character string. The second character string may represent, e.g., a delete command or a repeat instruction command.

22 Claims, 14 Drawing Sheets

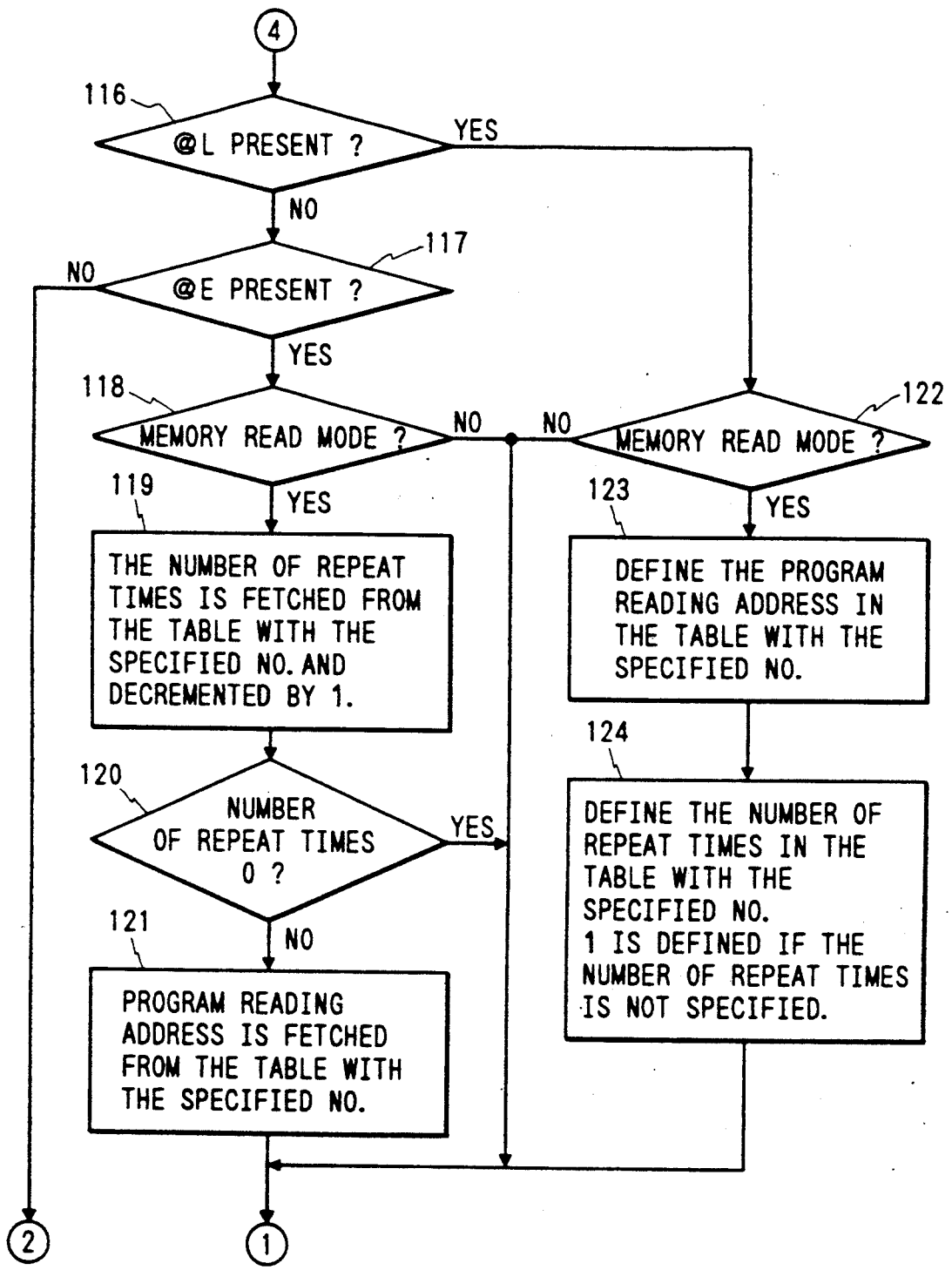

NUMERICAL CONTROL UNIT

BACKGROUND OF THE INVENTION

1. Field of the Invention

The present invention relates to a numerical contorl unit and, particularly, to the input processing of a machining program for the numerical control unit.

2. Background of the Invention

A numerical control unit performs numerical control processing in accordance with a machining program provided from a paper tape, etc. Specifically, the numerical control unit drives a machine tool for machining a workpiece according to the results of processing.

FIG. 13 is a block diagram of a numerical control unit known in the art. A machining program read from a tape reader 11 on a block-by-block basis is first entered into a control unit 12 which contains a processor, a control program memory, etc. The control unit 12 then performs numerical control processing in accordance with the machining program and drives servo motors of a machine tool 14 for moving a table or a tool as preprogrammed, or for controlling other functions of the machine tool 14, e.g., coolant ON/OFF, spindle forward-/reverse/stop, etc., via an electrical control box 13. The known numerical control unit includes a control panel 15 having zeroing, jogging and other command switches, buttons, etc., a manual data input device 16 (hereinafter referred to as an "MDI") for manually entering block-by-block command data, etc., and a display unit 17 for displaying the current position, etc., of the machine.

A computerized numerical control unit system (hereinafter referred to as a "CNC") includes tape reader or other program input device 11, control unit 12, control box 13, control panel 15, manual input device 16 and display 17. As described above, the control unit 12 of the CNC is a computer-controller apparatus having a processor (CPU), a control program memory, etc., and the processor controls the machine tool through predetermined numerical control processing in accordance with a control program and the machining program.

In general, even if exactly the same machining is to be carried out, slight modifications must be made to the CNC machining program because of different machine tools and CNC models. Specifically, different command values may be provided depending on the specific machine tool and CNC type employed. For instance, one CNC machine tool interprets command M201 as a coolant ON command while a different CNC machine tool would employ command M305. Consequently, in such a case, a new CNC machining program must be written for each CNC machine tool employed, although most contents of that program are the same.

To overcome this disadvantage, it has been proposed to register in a memory 20, as shown in FIG. 14, conversion tables (GTB), (MTB) and (PTB) for converting the numerical value data of specific word data (G codes, M codes and coordinate value command codes) in the machining program (e.g., changing an M command value "201" into "305") and converting the word data of coordinate value command codes (e.g., changing word data "X" into "Y" and vice versa). This conversion table scheme is described in Japanese Patent Disclosure Publication No. 267804-1987.

However, since the conversion tables illustrated in FIG. 14 convert only the numerical value data of the G and M command codes and the word data of the coordinate value command codes, a new machining program must still be written if even a small portion of the original machining program is to be changed, e.g., if the machining program is to be changed to reflect the different machining shown in FIGS. 15(a) and 15(b), for example.

To rectify this disadvantage, it is known in the art to write a machining program by means of an optional block skip function as described in Japanese Patent Publication No. 46846-1986. This reference describes a numerical control unit equipped with an optional block skip function.

FIG. 16 is a block diagram showing the major components of the prior art device which includes a tape reader 11, memory 20, a select switch 21, a block select switch set 22, a block skip circuit 23, a buffer storage circuit 24, a data processor 25, and a machining program tape.

FIGS. 15(a) and 15(b) are machining diagrams used to describe the operation of the known unit shown in FIG. 16, wherein the numeral 40 is a workpiece to be machined and numerals 41, 42 and 43 are positions of holes to be drilled.

When the holes are to be drilled in the positions 41, 42 and 43 specified by an operator as shown in FIG. 15(a), it is first necessary to include the following three blocks in the drilling process section of the machining program:

/ 1N101G81X31 . . . ;
/ 2N102G81X32 . . . ;
/ 3N103G81X33 . . . ;

The slash, ("/") preceding each block is skipped object information indicating that the block is under optional block skip control, and the subsequent character 1, 2 or 3 is skip select information which determines whether or not the block is to be skipped. N101 to N103 are beginnings of data words commanding that the holes be drilled in the positions 41 to 43, respectively, and ";" is a character indicating a block end. The program including the above three blocks is stored in a numerical value control information recording medium, such as paper tape, in the form of a machining program or stored directly in the internal memory 20 of the numerical control unit as numerical value information.

On the control panel, there is provided the block select switch set 22 for entering information representing which of the blocks under optional block skip control and stored in the numerical value information recording medium is/are to be valid and is/are to be invalid in actual machining. Specifically, as shown in FIG. 17, the block select switch set 22 comprises, for example, three switches 31, 32, 33 arranged in correspondence with skip select information 1, 2 and 3. An "off" switch provides information to the block skip circuit 23 indicating that the corresponding block is valid, whereas an "on" switch provides information to the block skip circuit 23 indicating that the corresponding block is invalid.

Hence, the operator moves the block select switches 22 to determine whether or not holes are to be drilled in the positions 41 through 43. Thus, different sets of holes shown in FIGS. 15(a) and 15(b) can be drilled with a single machining program.

In the known method using the optional block skip, however, the optional block skip command must be specified for each block and whether or not a block is to be executed or not is selected by the select switch. As such, the switch setting operation is rather cumbersome and the operator is prone to misoperate the switch. In addition, when the machining program is to be modified little by little for each machine tool model, the machining program must be altered accordingly, resulting in increased expenses and overall costs.

As a programmable process of controlling the machining program, it has been conceived to control a sequence of machining program execution by means of a user macro method as described in Japanese Patent Disclosure Publication No. 168223-1981. According to this method, the sequence of machining program execution can be controlled as necessary by specifying commands which control the sequence of machining program execution, e.g., IF and WHILE statements.

In the method using the user macro discussed above, the processing capability of the user macro must be incorporated into the CNC system, resulting in a modification to the whole CNC system. Further, each time the sequence of machining program execution is to be altered the operator must, for example, define data for the macro variable because that sequence is controlled in accordance with the macro variable. Therefore, the setting operation is troublesome and misoperation is likely.

SUMMARY OF THE INVENTION

It is an object of the present invention to overcome the disadvantages in the prior art by providing a low-cost, highly-functional CNC which allows a machining program corresponding to each machine tool or each machining pattern to be run without modifying the machining program and without greatly altering the CNC system.

A numerical control unit according to the present invention is designed to perform numerical control processing in accordance with a machining program and to drive a machine tool in accordance with the results of the processing for machining a workpiece. The numerical control unit includes a machining program conversion table for restoring information for converting a character string specified in the machining program into another character string representing a desired machining command.

The numerical control unit also includes a machining program conversion table for restoring information for converting the specified character string in the machining program into the other character string, and machining program conversion processing means for processing the machining program in accordance with a predetermined character string pattern if the specified character string has been converted into the predetermined character string pattern.

The machining program conversion table of the invention converts a character string specified in the machining program into a desired machining command, e.g., COLON, into a coolant ON command, M305.

The machining program conversion processing means concerned with the present invention achieves functions, such as block delete, in accordance with information of the machining program conversion table.

BRIEF DESCRIPTION OF THE DRAWINGS

FIGS. 8(a)-8(d) show a flowchart illustrating the operation of a machining program conversion processor;

DETAILED DESCRIPTION OF THE PREFERRED EMBODIMENTS

Figure 1:
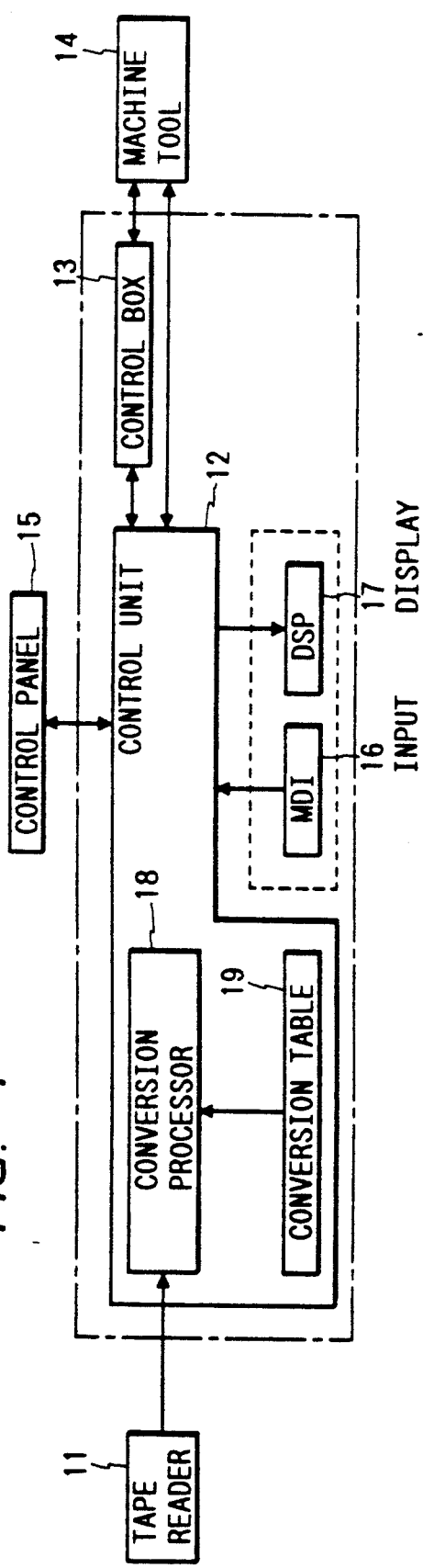
FIG. 1 is a block diagram of a numerical control unit according to a first embodiment of the invention.
Figure 13:
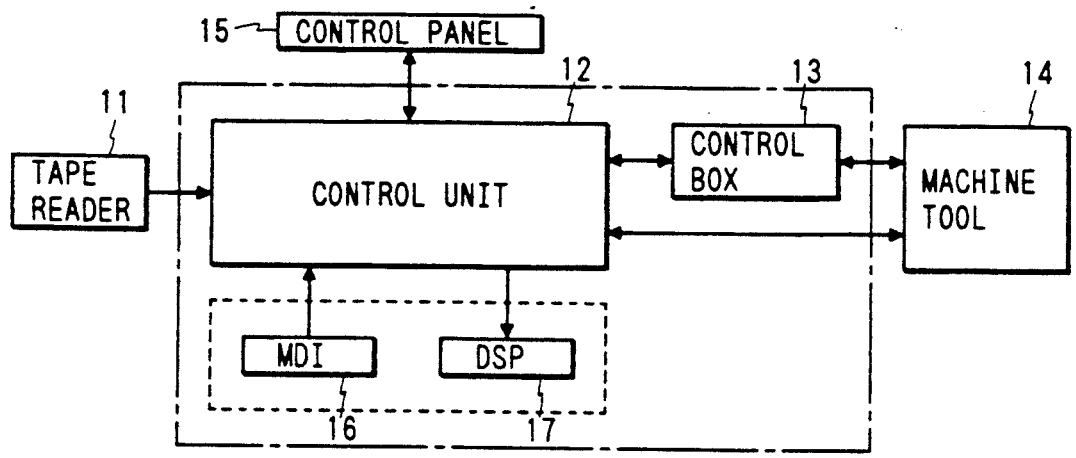
FIG. 13 is a block diagram of a known numerical control unit.

An embodiment of the present invention will now be described in detail with reference to the drawings. FIG. 1 is a block diagram of a CNC according to a first embodiment of the invention. As compared with the known CNC of FIG. 13, the CNC shown in FIG. 1 is characterized in that it has a machining program conversion processor 18 and a machining program conversion table 19.

Figure 2:
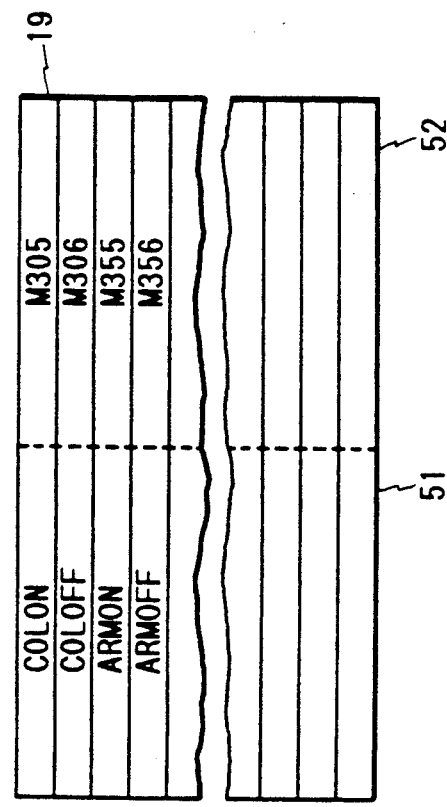
FIG. 2 shows a machining program conversion table according to the invention.

In accordance with the machining program conversion table 19 illustrated in greater detail in FIGS. 2, 5, 6 and 7, the machining program conversion processor 18 operationally shown in detail in FIG. 8 converts the machining program read from a tape reader 11 and causes execution of the converted machining program as in the processing of the known CNC. The machining program conversion processor 18 includes a ROM or a RAM and the machining program conversion table 19 has a format, for example, as shown in FIG. 2. Specifically, table 19 includes character strings to be converted 51 and converted character strings 52. Any character string to be converted 51 existing in the machining program is automatically replaced by the corresponding converted character string 52. For the character strings to be converted 51 and the converted character strings 52, any character string within a predetermined length may be defined up to a predetermined limit. This number is limited only by the memory size of the machining program conversion table 19. It will be appreciated that the character strings 51 are not in the form of known command codes but rather in easy-to-identify generic descriptive shorthand for the function to be controlled. The strings 52 are of course the corresponding central codes valid on the particular machine being used. As an example, the following machining program block is converted as indicated below in accordance with the machining program conversion table 19 shown in FIG. 2:

Entered machining program block:
N100 G00 X70000 Y-50000 COLON;
Converted machining program block:
N100 G00 X70000 Y-50000 M305;

In the above example, the character string pattern of COLON is converted into M305 (the coolant ON command for this machine). As indicated by this example, any character string may be defined for both the character string to be converted 51 and the converted character string 52. This allows the machining program to be written in an easy format independent of the CNC machine tool model by programming with symbolic character strings, like COLON, that are generic to multiple machine types. These character strings are not control commands (e.g., M codes) specific to the machine type, like M305. For instance, if the coolant ON command is M201 on machine A, but is M305 on machine B, the machining program in symbolic shorthand is applicable to both machines A and B by predefining the machining program conversion table 19 as follows:

Machining program conversion table 19 for CNC machine tool A:

*COLON=M201*

Machining program conversion table 19 for CNC machine tool B:

*COLON=M305*

Figure 3:
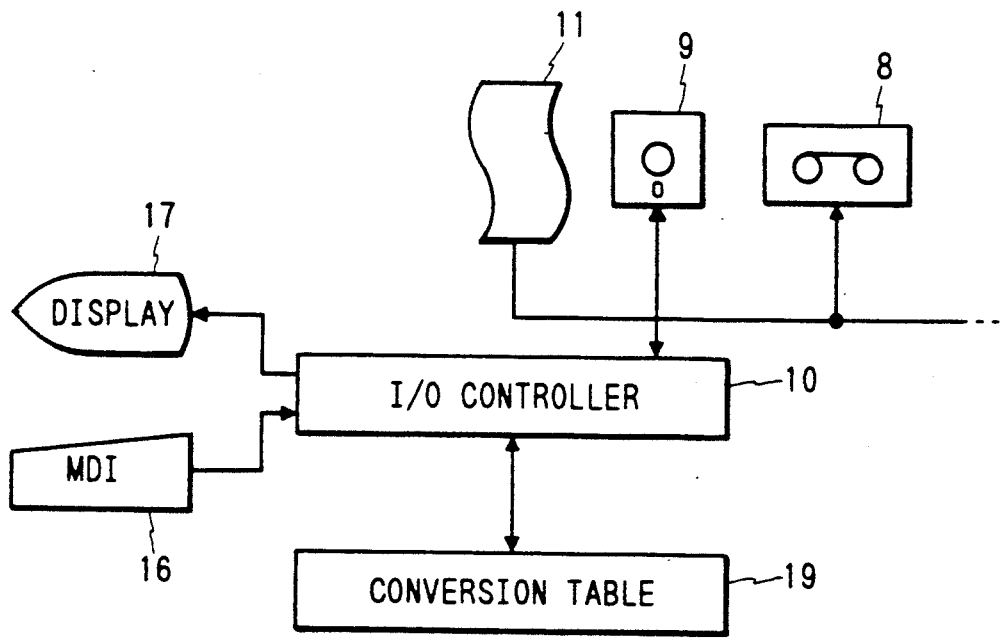
FIG. 3 is a block diagram illustrating the main components of a numerical control system using the machining program conversion table shown in FIG. 2.

The machining program conversion table 19 may be defined from the MDI 16 shown in FIG. 3 and the contents thereof can be confirmed on the display unit 17. The machining program conversion table 19 is formatted to allow data to be transferred to and from external I/O devices such as a cassette tape reader 8, a floppy disk unit 9 and the tape reader 11. The numeral 10 in FIG. 3 indicates an I/O controller for controlling data transfer to and from any of the external I/O devices.

The operations of the present invention will now be described.

Character String Pattern Converting Operation

Figure 4:
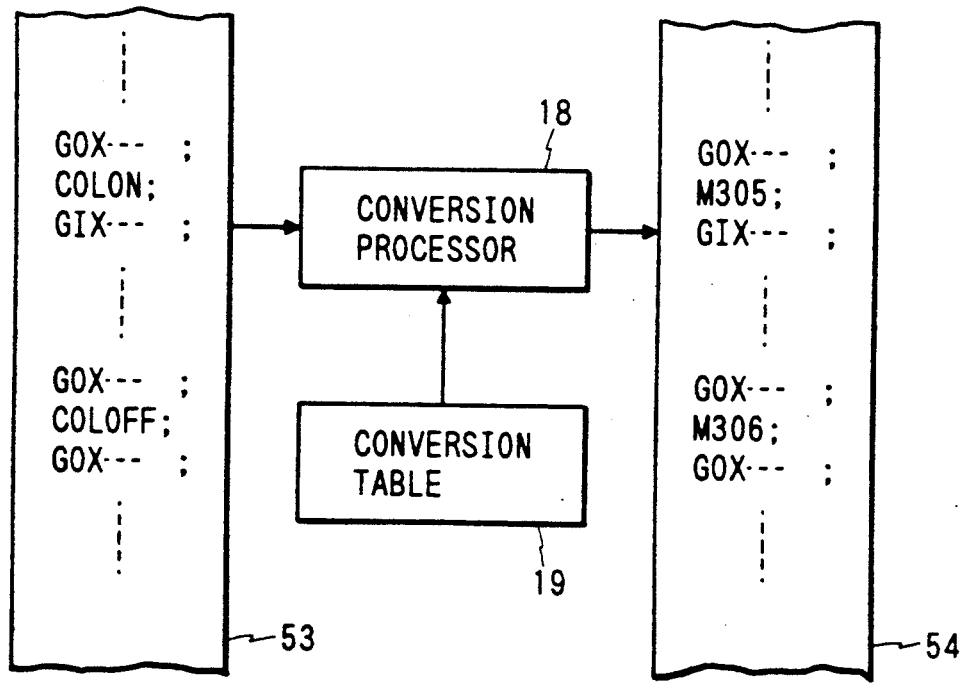
FIGS. 4 to 7 illustrate conversion examples using the machining program conversion table.

FIG. 4 indicates that the machining program conversion processor 18 has converted an entered machining program 53 into a machining program 54 in accordance with the machining program conversion table 19. The data defined in conversion table 19 is the data shown in FIG. 2. FIG. 4 indicates that COLON has been converted into M305 and COLOFF into M306.

Reserved Word Converting Operation

When a converted character string matches a reserved word predetermined by the system, processing corresponding to that reserved word is performed.
The reserved words include:
@DA . . . Deletes the corresponding entire block.
@DS to @DE . . . Deletes all data between @DS and @DE.
@L to @E . . . Repeats a block between @L and @E a specified number of times.

Operation of Reserved Word @DA

Figure 15A:
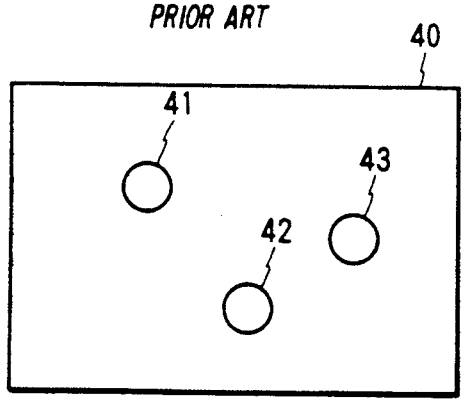
FIGS. 15(a) and 15(b) are machining diagrams illustrating machining operations.
Figure 15B:
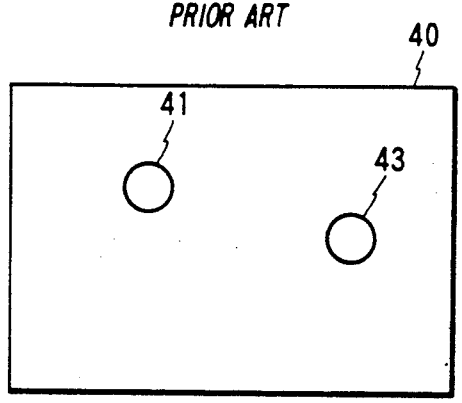
Figure 14:
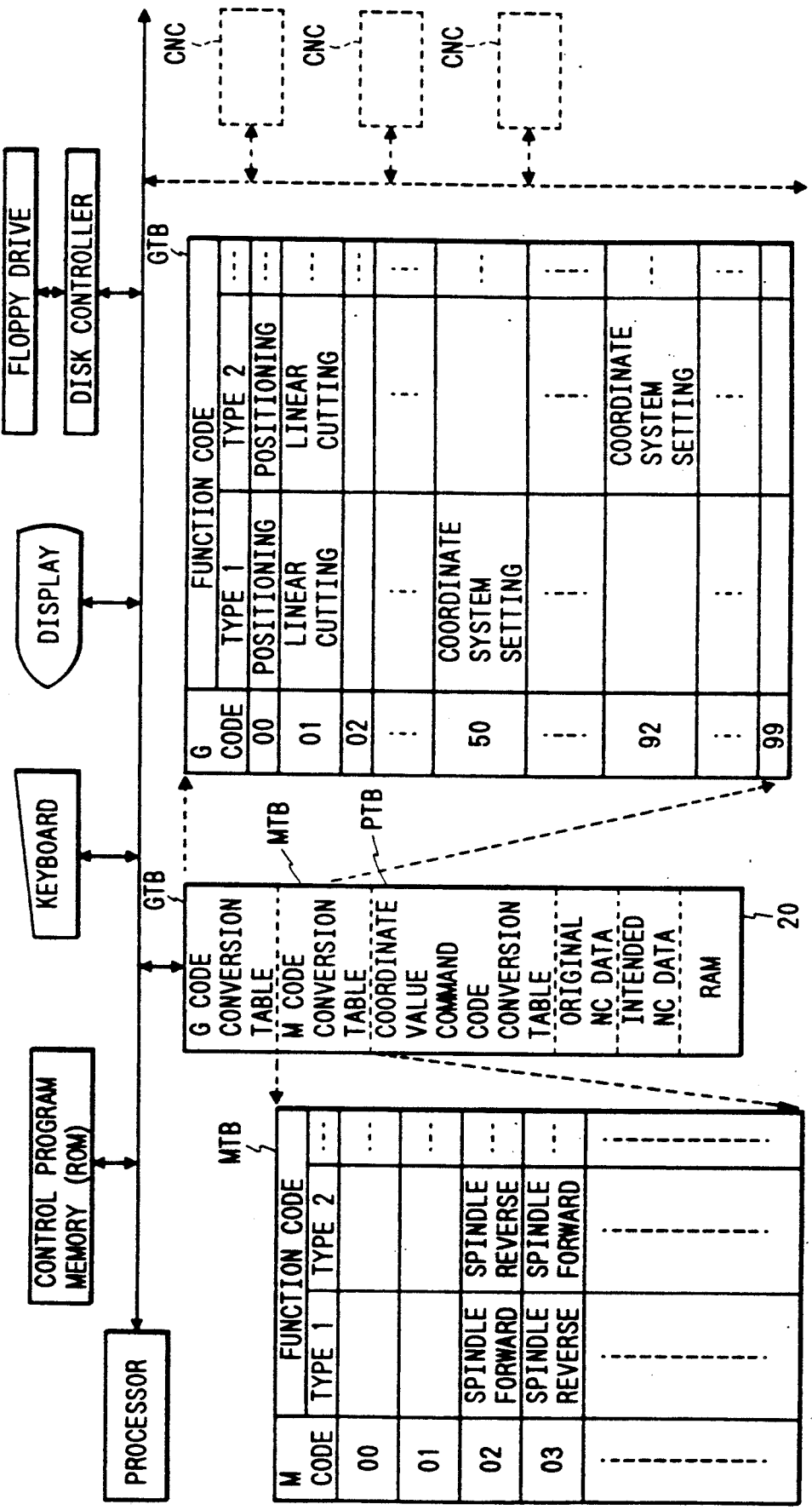
FIG. 14 is a block diagram illustrating the major components of the prior art unit.

FIG. 15(b) is a workpiece example employed to describe the operation of reserved word @DA, wherein the numeral 40 indicates a workpiece to be machined, and numerals 41 and 43 hole positions to be drilled. This diagram is equivalent to the diagram shown in FIG. 15(a) with the exception of the hole 42 which is not to be drilled in FIG. 15(b).

Figure 5:
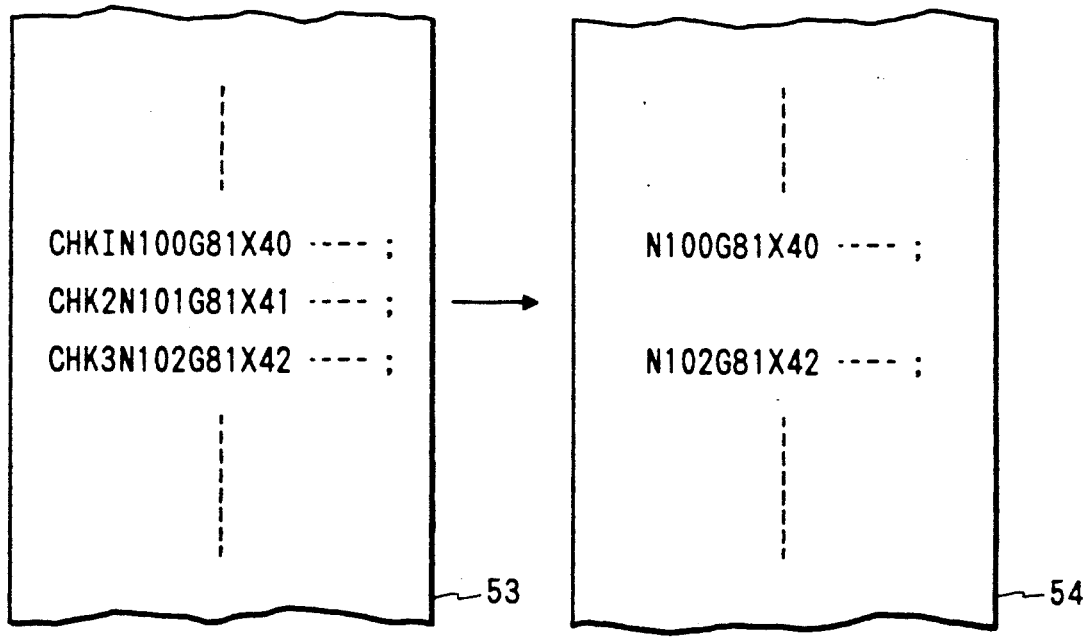
Figure 5:
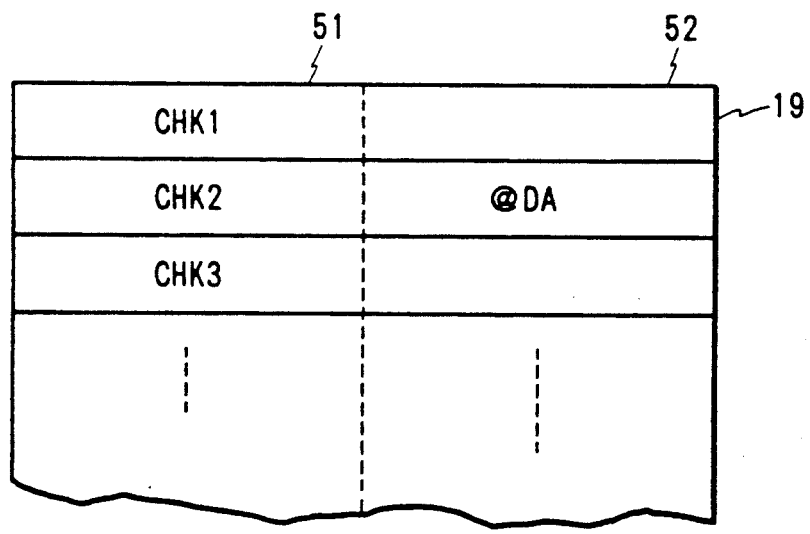

FIG. 5 illustrates the conversion of the machining program and is used to described the operation of reserved word @DA, wherein the numeral 53 indicates an entered machining program, 54 a converted machining program, and the illustrated data is assumed to have been defined in the machining program conversion table 19. In the table 19, CHK1, CHK2 and CHK3 are character strings 51 to be converted and are converted as follows by the machining program conversion processor 18:
CHK1=(no conversion)
CHK2=@DA
CHK3=(no conversion)

Figure 16:
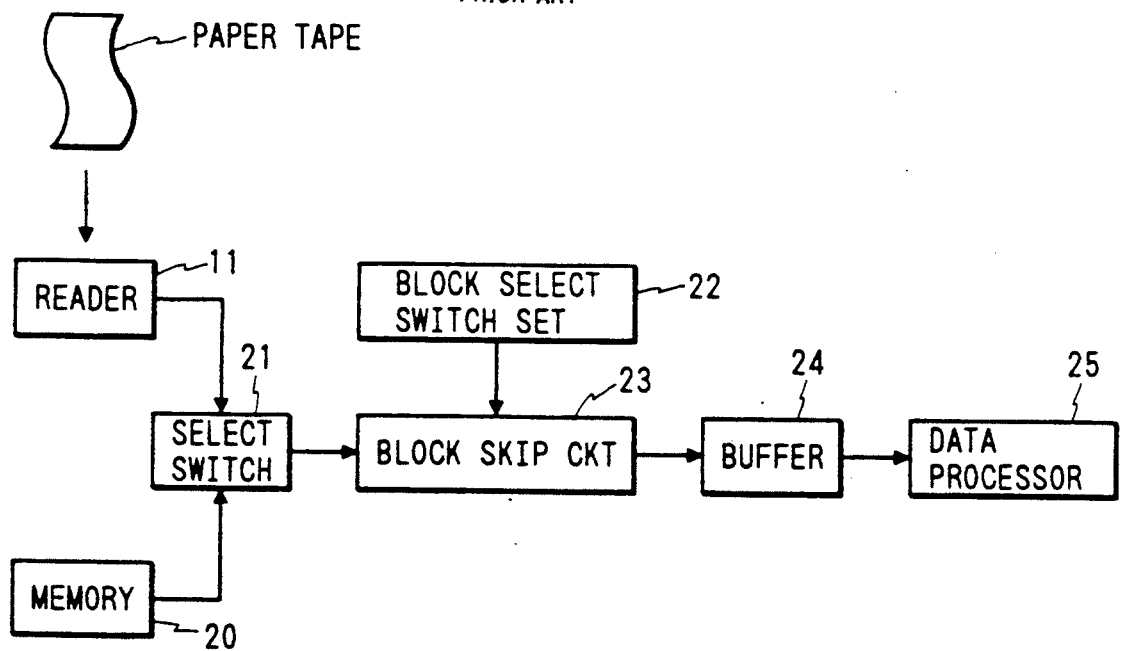
FIG. 16 is a block diagram illustrating the major components of a prior art device.
Figure 17:
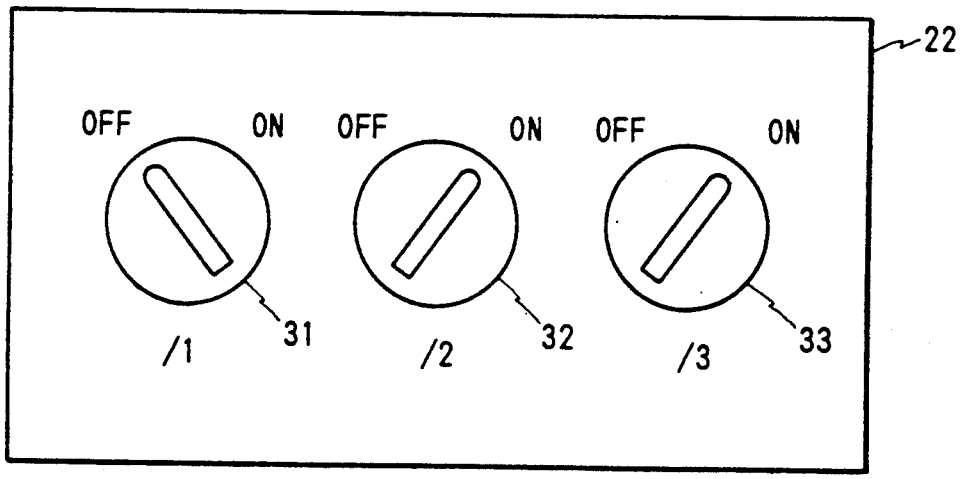
FIG. 17 is a top view of block select switches used with a prior art device.

The empty columns in the conversion table 19 indicate that the corresponding character strings (CHK1, CHK3) are to be ignored, e.g.:
CHK N100 G81 X40 . . . ;
is to be converted as follows:
N100 G81 X40 . . . ;

Since @DA is a reserved word, processing corresponding to @DA, i.e., the processing of deleting the whole block, is performed by the machining program conversion processor 18. Namely, use of @DA allows a function equivalent to block delete in the known system of FIGS. 16-17 to be achieved. Additionally, this method allows machining to be commanded easily and accurately because it does not require the operator to move a select switch.

Operation of Reserved Words @DS, @DE

Figure 6:
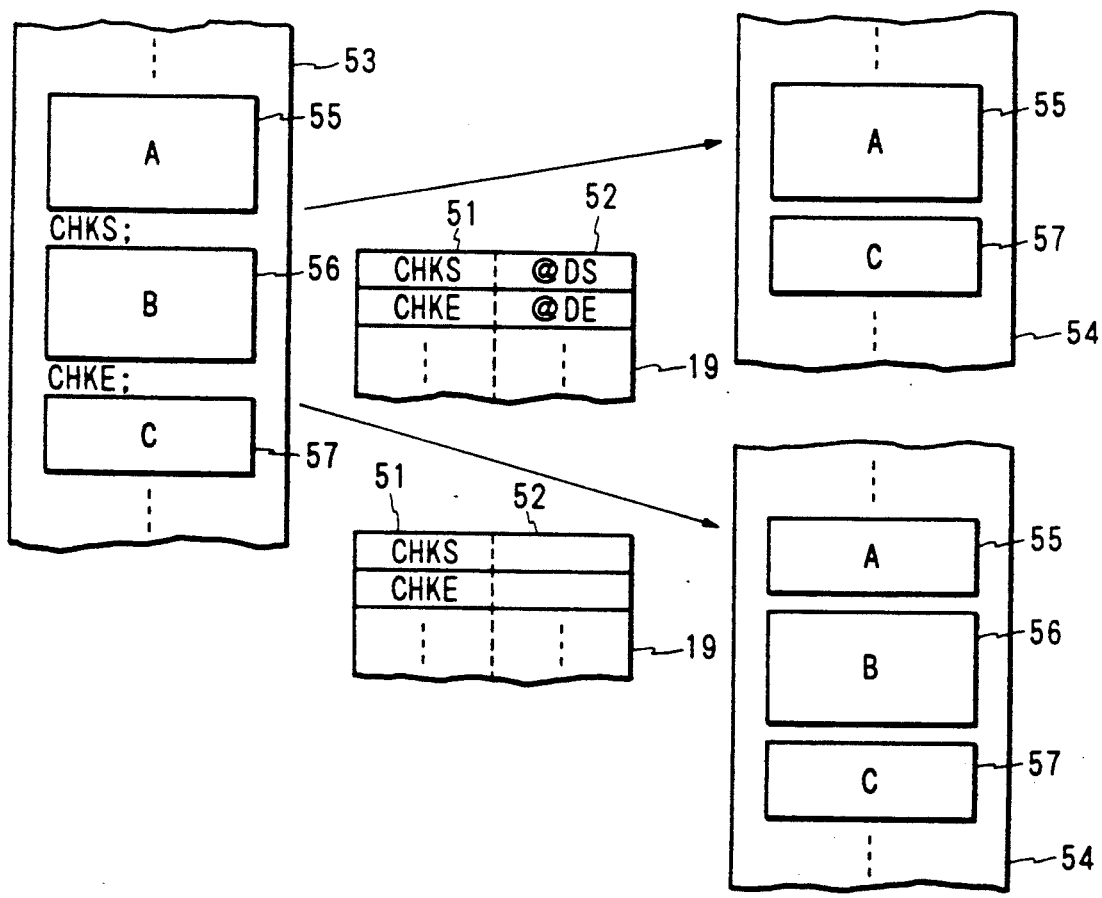

FIG. 6 illustrates the conversion of a machining program, and is used to describe the operation of reserved words @DS, @DE. Assume that the machining program indicated by the numeral 53 has been entered. 55, 56 and 57 are program portions representing a series of machining steps. CHKS and CHKE are the character strings to be converted. The upper conversion example in FIG. 6 indicates that the character strings CHKS and CHKE are to be converted into @DS and @DE, respectively, by the machining program conversion processor 18, and processing corresponding to @DS and @DE, i.e., the processing of deleting the whole program portion therebetween, is performed using @DS and @DE as reserved words. This deletes the area B of the machining program indicated by the numeral 56. The lower conversion example in FIG. 6 indicates that CHKS and CHKE are ignored because the converted character strings 52 corresponding to CHKS and CHKE do not exist.

Operation Of Reserved Words @L, @E

Figure 7:
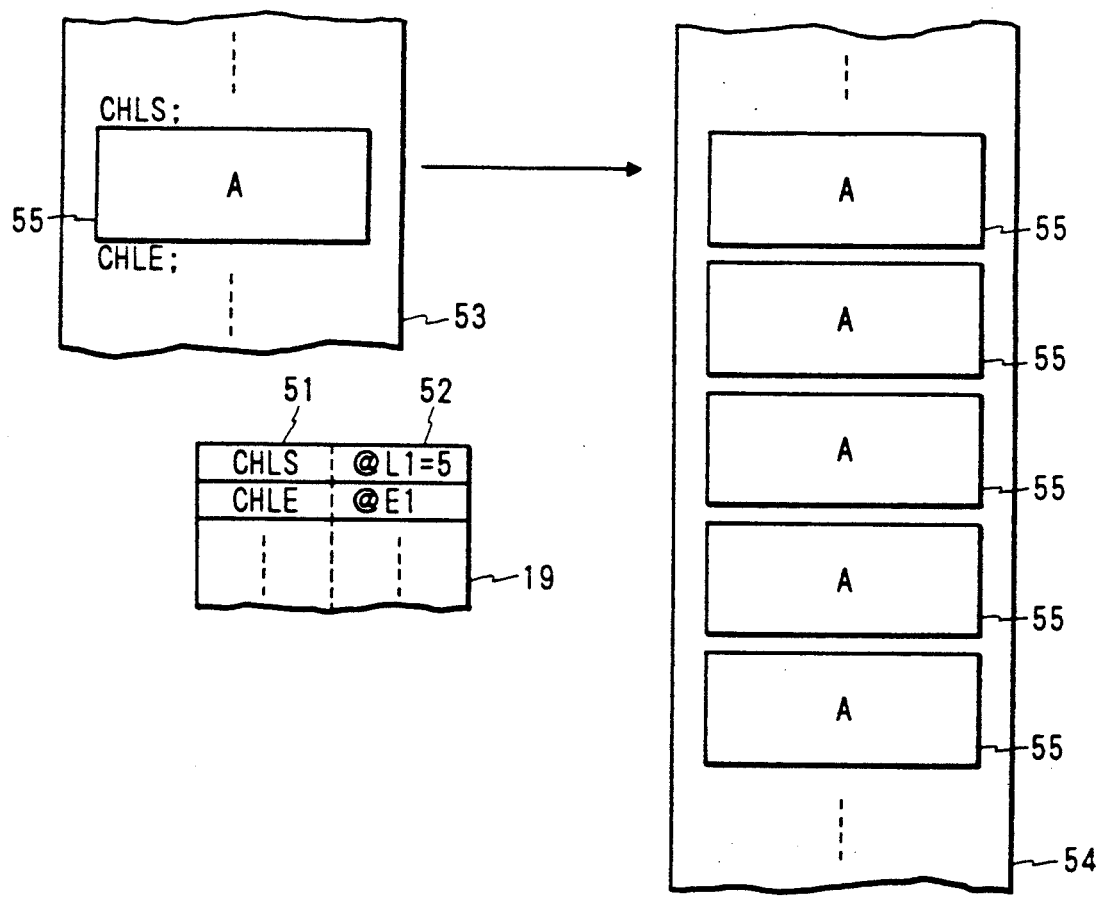
Figure 8A:
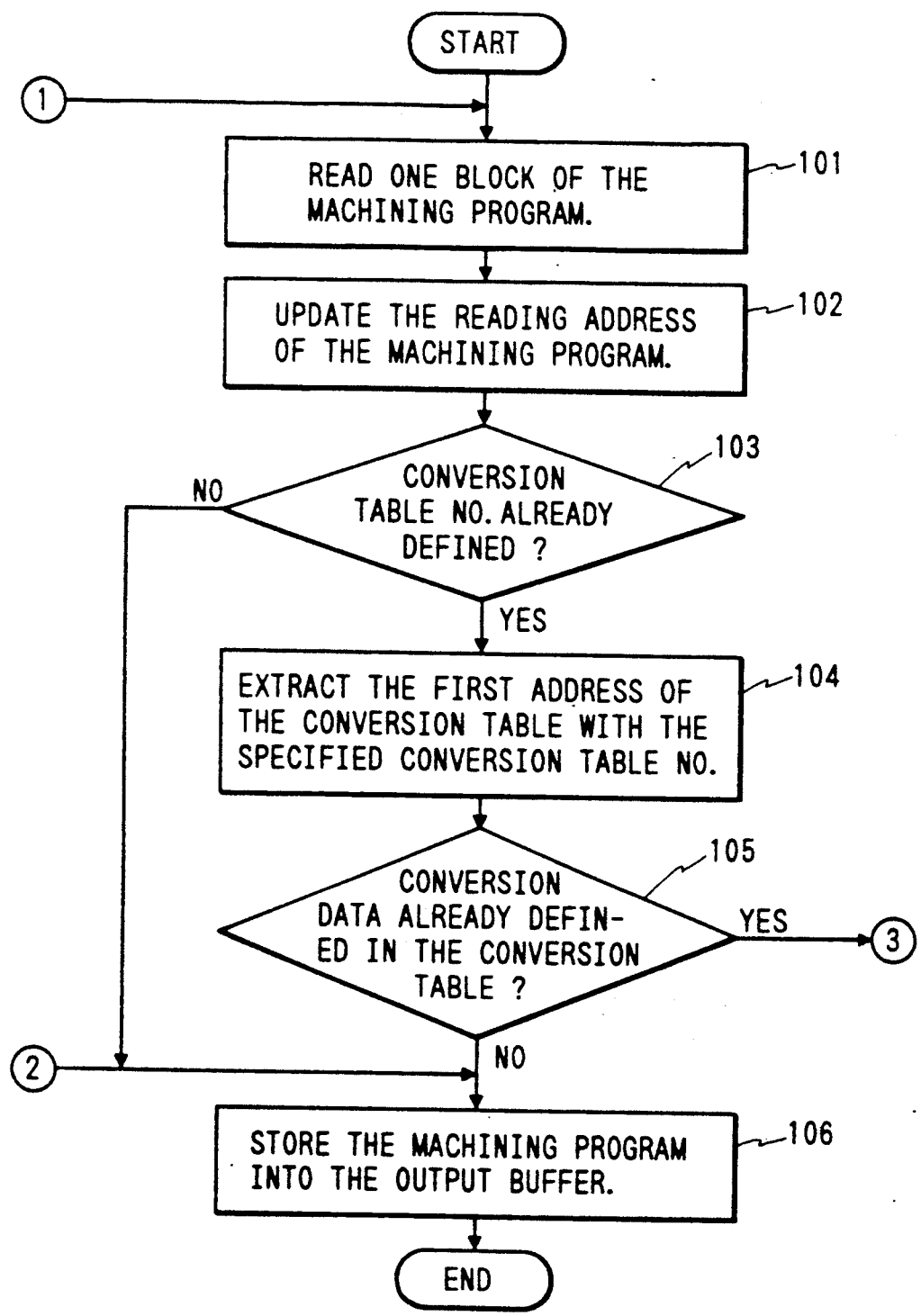
Figure 8B:
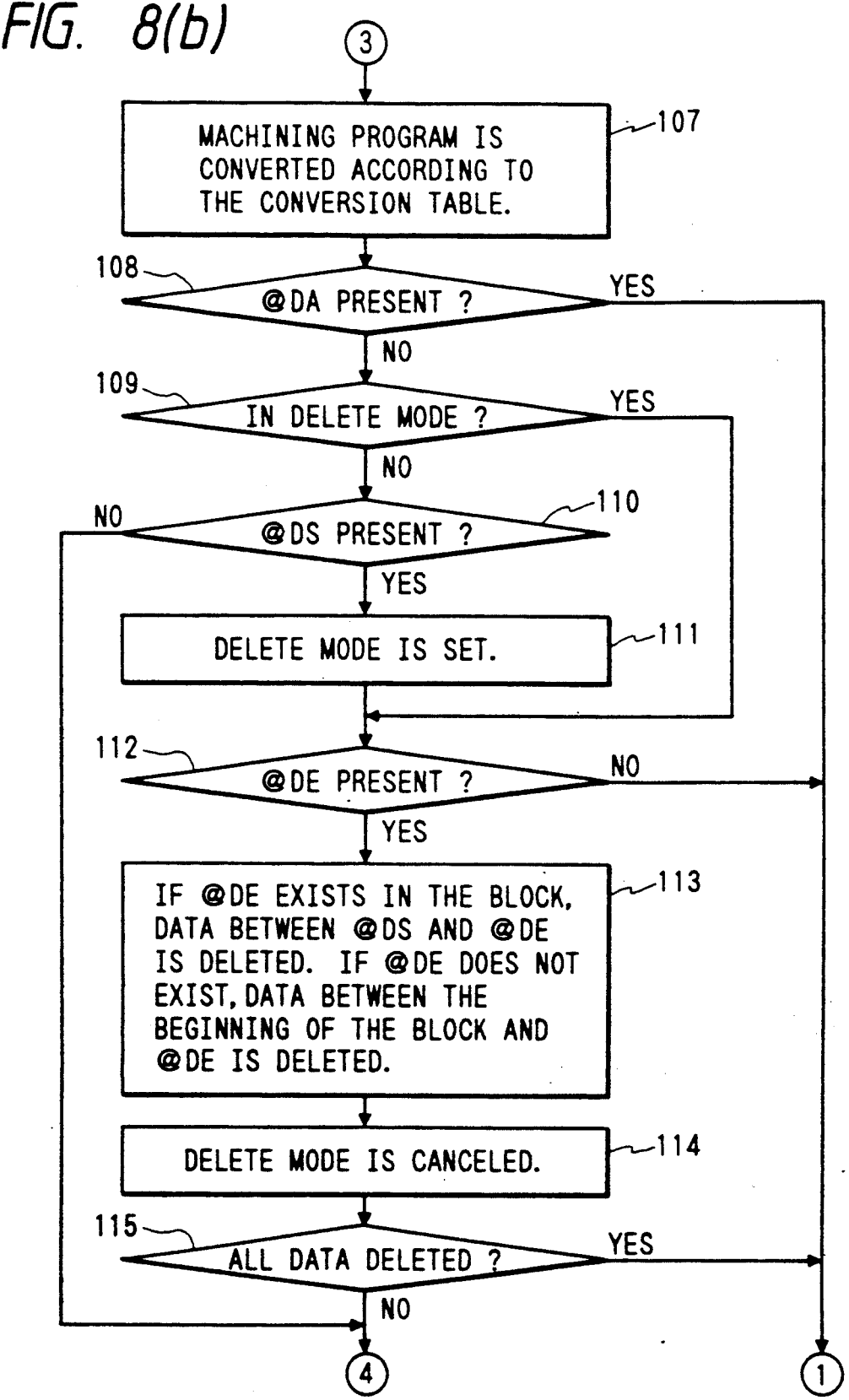
Figure 8D:
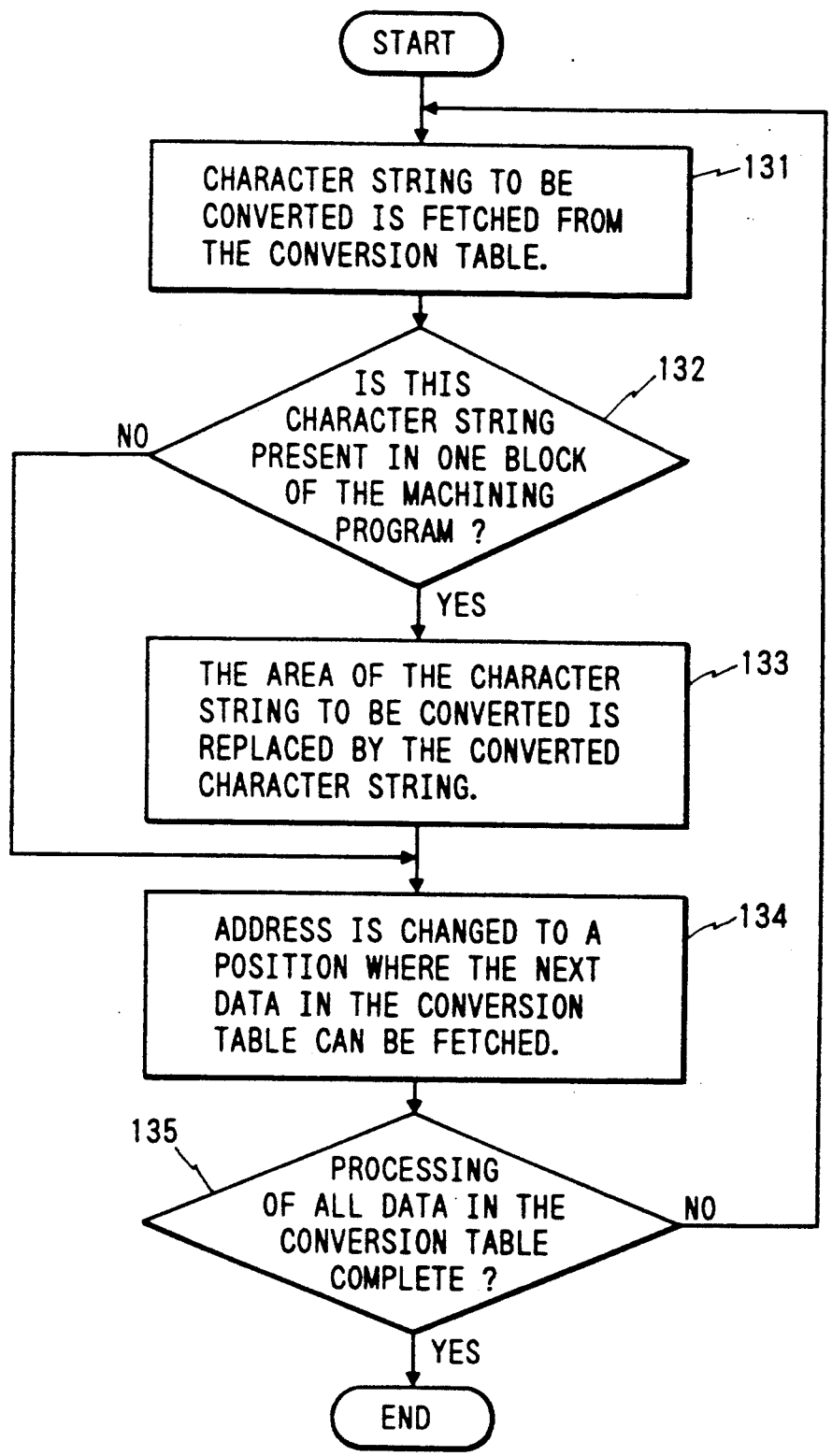

FIG. 7 illustrates the conversion of a machining program, and is employed to describe the operation of the reserved words @L, @E. Assume that the machining program indicated by the numeral 53 has been entered. The numeral 55 is a portion A representing a series of machining steps, and CHLS and CHLE are character strings to be converted. The character strings CHLS and CHLE are converted into @L1=5 and @E1, respectively, by the machining program conversion processor 18, and processing corresponding to the @L and @E words, i.e., the processing of repeating the portion A therebetween by the specified number of times, is performed. The number of repeats is defined by the numerical value subsequent to "=" in @L1=5. The repeated area may be nested by the numerical value following "L". An example of nesting is shown below:

```
•
•
•
@L1 = 3 ─────────────────────────┐
•                                │
•                                │
@L2 = 5 ──────┐                  │
•             │                  │
•             │ This whole area is │ This whole area is
@E2 ──────────┘ is repeated 5 times │ is repeated 3 times
•                                │
•                                │
@E1 ─────────────────────────────┘
•
•
```

The example in FIG. 7 indicates that the area 55 has been repeated five times, i.e., use of @L and @E allows the original machining program to be written in a short format for a machining program that will repeat the same pattern.

FIGS. 8(a)-8(d) show a flowchart illustrating the processing sequence of the present invention. The operation of the numerical-control machining program conversion processor 18 of the present invention will now be described in detail according to the flowchart shown in FIGS. 8(a)-8(d).

Step (101): Reads data for one block of the machining program. In this case, the machining program may either be read directly from the external I/O device, e.g., a tape reader, or from the memory which stores the program data.

Step (102): Updates the machining program reading address. This step is executed only when the machining program stored in the internal memory of the CNC is processed and therefore this step is not required when the program is read directly from the external I/O device.

Step (103): Determines whether the machining program conversion table 19 number has been defined. When more than one table 19 exists, this step specifies the conversion table to be used. This step will be described in more detail later in FIG. 10. Even if there is one table, this step is used to determine whether or not the table 19 has been specified for use. If this step determines that conversion is not required, the operation progresses to step (106). Otherwise, step (104) is executed.

Step (104): Sets the first address (address where the first conversion processing data 51, 52 is stored) of the specified table 19.

Step (105): Determines whether or not conversion processing data 51, 52 has been defined in the table 19. If the data has not been defined in the conversion table 19, the operation moves on to step (106). If the data has been defined, then step (107) is executed.

Step (106): Stores one block (for which any conversion processing is complete) of the machining program into the machining program output buffer (not illustrated).

Step (107): Causes the machining program entered at step (101) to be converted according to the conversion table 19. This step will be described in further detail in FIG. 13(d).

Step (108): Determines whether or not the reserved word @DA has been specified. If @DA has been specified, the operation proceeds to step (101) to effectively delete the one block specified by @DA. If @DA has not been specified, step (109) is executed.

Step (109): Determines whether the operation is in the delete mode. If in the delete mode, the operation goes on to step (112). If not, step (110) is executed. A delete mode indicates a period of time when the machining program is being deleted over more than one block after @DS has been commanded.

Step (110): Determines whether or not the reserved word @DS has been specified. If @DS has been specified, then the operation proceeds to step (111). If not specified, step (116) is executed.

Step (111): Since @DS has been specified, delete mode is set to delete the subsequent data until @DE is specified.

Step (112): Determines whether or not the reserved word @DE has been specified. If @DE has not been specified, the operation proceeds to step (101) to effectively delete all blocks until @DE is specified. If @DE has been specified, step (113) is executed.

Step (113): Deletes data between @DS and @DE if @DS has been specified in a block. Otherwise, deletes data between the beginning of the block and @DE. If @DS and @DE have been specified within the same block, only character strings therebetween are deleted, e.g.:

Block before processing of @DS and @DE:
  N100G01X70000Y-20000@DSM101M105@DEF2500;
Block after processing of @DS and @DE:

N100G01X70000Y-20000        F2500;

Step (114): Cancels delete mode because @DE has been specified.

Step (115): Determines whether the converted machining program is present or absent, i.e., determines whether or not all blocks of that machining program have been deleted as a result of the conversion. If all the blocks have been deleted, the operation returns to step (101). If block data remains, step (116) is executed. The following example illustrates a block from which all data has been deleted:

Block before processing of @DS and @DE:
  @DSN100G01X70000Y-20000F2500@DE;
Block after processing of @DS and @DE:

Step (116): Determines whether or not the reserved word @L has been specified. If @L has been specified, the operation progresses to step (122), and if not, step (117) is executed.

Step (117): Determines whether or not the reserved word @E has been specified. If @E has been specified, the operation advances to step (118), and if not, step (106) is executed.

Step (118): Determines whether or not the operation is in a memory read mode, i.e., determines whether it is in a mode wherein processing is to be performed after the entered machining program has been stored in the memory. Since the repeat processing by @L can only be performed in this memory mode, @L and @E are ignored in any other mode, i.e., when the machining program is read directly from the external I/O device, e.g., tape reader. If in a memory read mode, the operation advances to step (119), and if not, step (101) is executed.

Figures 9, 10:
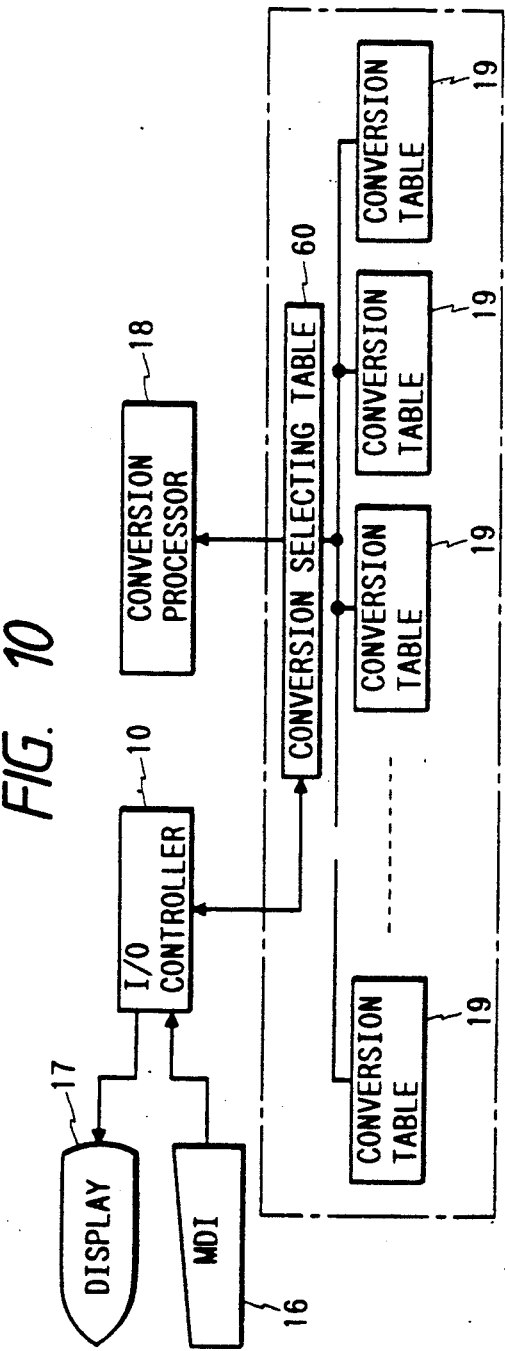
FIG. 9 shows an internal table format.
FIG. 10 is a block diagram illustrating the major components of a numerical control system according to an embodiment of the invention.

Step (119): Decrements by 1 the number of repeat times specified by @L. FIG. 9 shows the format of a table used for this purpose. The numeral 140 indicates the table, the area 141 stores the machining program reading address, and the area 142 stores the number of repeat times specified by @L. The number following "L", corresponds to a number to be specified for nesting, e.g., @L1, @L2.

Step (120): Determines whether the number of repeat times decremented at step (119) is zero or not. If it is zero, the operation returns to step (101). If it is other than zero, step (121) is executed. Namely, if the number of repeat times is zero, the repeat processing is finished and the next block is read. If it is other than zero, the specified area of the machining program is repeated.

Step (121): Fetches the machining program reading address from the table 140 described in step (119). This step is executed to define the reading address for the read processing of the machining program to be performed at step (101) subsequently. This address indicates the first address of the repeated area.

Step (122): Determines whether or not the operation is in a memory read mode as in step (118). If in the memory read mode, the operation proceeds to step (122). If not, step (101) is executed.

Step (123): Defines the machining program reading address in the area 141 of the table 140 explained at step (119). In this case, the address is set to the area corresponding to the numerical value specified after L, e.g., @L1, @L2, @L3 . . . No specified value is regarded as 1.

Step (124): As in step (123), defines the number of repeat times specified after =, e.g., @L1=5, in the area 142 of the table 140. No specified number of repeat times is treated as 1. Step (101) is then executed.

The area of step (107), i.e., the way of converting the entered machining program according to the machining program conversion table 19, will now be described in further detail with reference to FIG. 8 (d).

Step (131): Fetches the character string to be converted from the conversion table 19.

Step (132): Determines whether the character string to be converted fetched at step (131) is present or absent in the block read at step (101). If it does not exist, the operation goes on to step (134). If it does, step (133) is executed.

Step (133): Fetches the converted character string 52 from the conversion table 19 and replaces the area of the character string to be converted fetched at step (131) with the character string 52 fetched. In the data example at top in the table, the COLON character string is replaced by M305 (coolant ON command).

Step (134): Updates the pointer so that the next data in the conversion table 19 may be fetched.

Step (135): Determines whether or not all the data defined in the conversion table 19 has been processed. If all the data has already been processed, the conversion processing is complete. If there still remains data to be processed, step (131) is executed.

All the above steps allow the conversion processing of the entered machining program to be performed by the machining program conversion processor 18 in accordance with the machining program conversion table 19.

It will be appreciated that as shown in FIG. 10, the CNC is configured so that a plurality of machining program conversion tables 19 may be provided with any of them selected by a machining program conversion table selecting table 60. The table 60 can be defined from the MDI 16 and its contents can be confirmed on the display unit 17.

Figure 11:
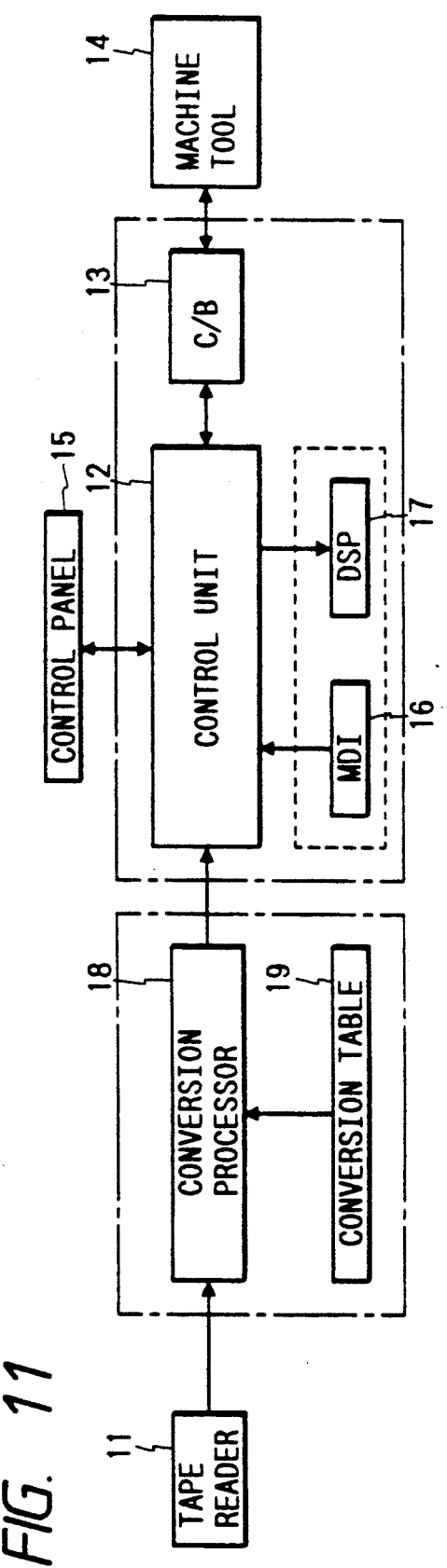
FIG. 11 is a block diagram illustrating the major components of a numerical control system according to an embodiment of the present invention.

It will also be appreciated that as shown in FIG. 11, the machining program conversion processor 18 is installed outside the CNC. In this case, data may either be set to the table 19 from the CNC or from an external device. This allows the function of the present invention to be added without making any modifications to the existing CNC system.

Figure 12A:
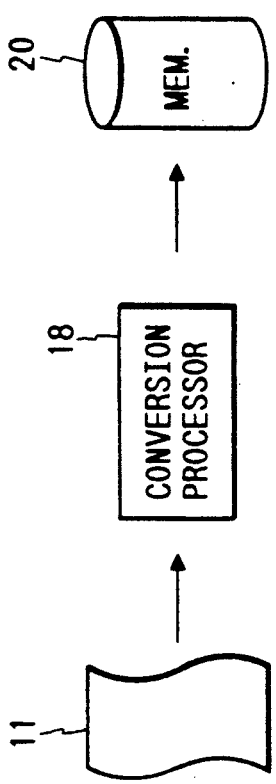
FIGS. 12(a)-(b) are block diagrams illustrating the main components of a numerical control system according to an embodiment of the present invention.

The conversion processing of the present invention is performed as shown in FIG. 12(a) by immediately converting the machining program entered from the external I/O device, such as the tape reader 11, by means of the machining program conversion processor 18, storing the conversion results into the memory 20, reading the machining program from the memory 20 before machining, and analyzing it by means of the known data processor 25 for machining. Without the memory 20, the machining may be conducted by analyzing the converted data by means of the data processor 25. This method is effective when the machining program, once converted, need not be reconverted into another format. Since the conversion of the machining program is performed only once when entered, it need not be performed for each of the CNCs used. This method is effective when the machining program is modified in accordance with the model of the CNC machine tool, when the original machining program is not entered into the numerical control system but rather the conversion results.

Figure 12B:
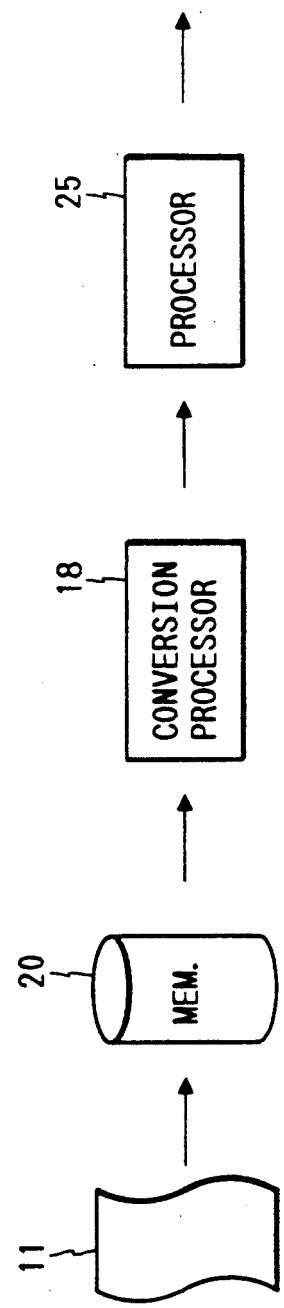

It will further be appreciated that as shown in FIG. 12(b), the machining program entered from the external I/O device, e.g., tape reader 11, is stored into the memory 20, from which the machining program is read before machining and converted by the machining program conversion processor 18 and the conversion results are analyzed by the data processor 25. This method is effective when the machining program must be altered according to the workpiece to be machined. The conversion processing of the machining program is performed before each machining. Since the original machining program is stored intact in the CNC, merely changing the machining program conversion table 19 permits the machining program to be changed into another pattern without requiring re-entering of the machining program.

It will be apparent that the reserved word types are not limited to those indicated in the embodiment of the present invention and may be added as required.

As described above, the embodiment of the present invention allows the entered machining program to be converted in accordance with the machining program conversion table so that a desired machining program may be obtained without altering the original machining program, and operation settings in which the operator is prone to make mistakes, e.g., the operation of the block select switches and the setting of the macro function data, can be eliminated, and moreover, the CNC functions can be improved significantly.

In addition, the contents of the machining program conversion table can be reserved and/or restored easily because they may be transferred to and from the external I/O device.

Further, a plurality of machining program conversion tables may be provided and any of them may be selected according to machining so that any machining task may be carried out without modifying the machining program conversion table, thereby minimizing the risks of operator mistakes, etc.

Further, the original machining program can be written in an easier format because any character string may be specified for the character strings to be converted in the conversion table, e.g., an M command value may be specified by a symbolic character string instead of simple numerical value data.

Furthermore, the invention permits a function to be added later to the existing CNC system because the function may be achieved by simply adding it to the input processing area of the machining program without altering the CNC system itself.

It will be apparent that the invention, as described above, achieves a low-cost, highly-functional CNC which allows a machining program to be run in accordance with a machine tool or machining without modifying the machining program itself and without greatly altering the CNC system.

The present invention also permits the machining program to be written with symbolic character strings which programmers, operators, etc., may understand easily.

What is claimed is:

1. A numerical control system for machining a workpiece, the system comprising:
   a predetermined machine tool for machining the workpiece;
   means for reading a machining control program for the workpiece, the machining control program including a first predetermined character string representing a symbolic character string that is generic to multiple machine types, not a specific machining command that is executable by one particular machine type;
   control means for supplying a machining control signal to said predetermined machine tool in accordance with a read machining control program; and
   conversion means, coupled to said control means, for storing a conversion table having information for converting said first predetermined character string read from the machining control program into a second predetermined character string, the second predetermined character string representing a specific machining command which can be performed by the predetermined machine tool, said control means supplying a machining control signal to said predetermined machine tool in accordance with the specific machining command.

2. The system as defined in claim 1, wherein said conversion processing means, coupled to said reading means and to said conversion table, controls said control means to supply the machining control signal to said predetermined machine tool.

3. The system as defined in claim 1, further comprising means for changing the contents of the stored conversion table.

4. The system as defined in claim 1, wherein said conversion means stores a plurality of different conversion tables each including information for converting a character string read from the machining control program.

5. The system as defined in claim 4, further comprising means for changing the contents of said plurality of conversion tables.

6. The system as defined in claim 4, wherein said system further includes means for inputting selection information representing a selected one of the stored conversion tables, said control means supplying machining control signals in accordance with the read machining control program and the conversion information of the selected one of the conversion tables.

7. The system as defined in claim 6, wherein said inputting means comprises: an input device for supplying the selection information; an input/output controller coupled to said input device; and a conversion selecting table means, coupled to said input/output controller, and to each of the conversion tables.

8. The system as defined in claim 1, wherein said second predetermined character string corresponds to one of a skip and repeat control signals, said one of the skip and repeat control signals being supplied to said predetermined machining tool based on said second predetermined character string.

9. The system as defined in claim 8, wherein the first predetermined character string is associated with a predetermined machining instruction of the machining control program, said second predetermined character string represents a skip command, and wherein said control means supplies said skip control signal such that the predetermined machine tool skips the predetermined machining instruction in accordance with the skip command of the second predetermined character string.

10. The system as defined in claim 8, wherein the machining control program further includes a third predetermined character string, said conversion table further includes information for converting the third predetermined character string into a fourth predetermined character string, said second predetermined character string represents a delete start instruction, and the fourth predetermined character string represents a delete stop instruction, and wherein said control means is operable to supply said skip control signal such that said predetermined machining tool skips any machining instruction of the machining control program located between the second and fourth predetermined character strings.

11. The system as defined in claim 8, wherein the machining control program further includes a third predetermined character string, said conversion table further includes information for converting the third predetermined character string into a fourth predetermined character string, said second predetermined character string represents a repeat start instruction, and the fourth predetermined character string represents a repeat stop instruction, and wherein said control means is operable to supply a control signal such that said predetermined machining tool repeats, a predetermined number of times, any machining instruction of the machining control program located between the second and fourth predetermined character strings.

12. A numerical control system for machining a workpiece, the system comprising:
   a predetermined machine tool for machining the workpiece;
   means for reading a machining control program for the workpiece, the machining control program including a plurality of machining instructions and a first predetermined character string;
   control means for supplying a machining control signal to said predetermined machine tool in accordance with a machining instruction of a read machining control program; and
   conversion means for storing a conversion table having information for converting the first predetermined character string read from the machining control program into a second predetermined character string corresponding to one of skip and repeat control signals to be supplied to said predetermined machining tool, said control means supplying said one of the skip and repeat control signals to said predetermined machine tool in accordance with the second predetermined character string.

13. The system as defined in claim 12, wherein the first predetermined character string is associated with a predetermined machining instruction of the machining control program, said second predetermined character string represents a skip command, and wherein said control means supplies said skip control signal such that the predetermined machine tool skips the predetermined machining instruction in accordance with the skip command of the second predetermined character string.

14. The system as defined in claim 12, wherein the machining control program further includes a third predetermined character string, said conversion table further includes information for converting the third predetermined character string into a fourth predetermined character string, said second predetermined character string represents a delete start instruction, and the fourth predetermined character string represents a delete stop instruction, and wherein said control means is operable to supply said skip control signal such that said predetermined machining tool skips any machining instruction of the machining control program located between the second and fourth predetermined character strings.

15. The system as defined in claim 12, wherein the machining control program further includes a third predetermined character string, said conversion table further includes information for converting the third predetermined character string into a fourth predetermined character string, said second predetermined character string represents a repeat start instruction, and the fourth predetermined character string represents a repeat stop instruction, and wherein said control means is operable to supply a control signal such that said predetermined machining tool repeats, a predetermined number of times, any machining instruction of the machining control program located between the second and fourth predetermined character strings.

16. The system as defined in claim 12, wherein said conversion means further comprises a conversion processing means, coupled to said reading means and to said control means, said conversion processing means controlling said control means to supply the machining control signal to said predetermined machine tool.

17. The system as defined in claim 12, further comprising means for changing the contents of the stored conversion table.

18. The system as defined in claim 12 wherein said control means includes said conversion means.

19. The system as defined in claim 12, wherein said conversion means stores a plurality of different conversion tables each including information for converting a character string read from the machining control program.

20. The system as defined in claim 19, further comprising means for changing the contents of each of said plurality of conversion tables.

21. The system as defined in claim 18, wherein said system further includes means for inputting selection information representing a selected one of the conversion tables, said control means supplying machining control signals in accordance with the read machining control program and the conversion information of the selected one of the conversion tables.

22. The system as defined in claim 21, wherein said inputting means comprises: an input device for supplying the selection information; an input/output controller coupled to said input device; and a conversion selecting table means, coupled to said input/output controller, and to each of the conversion tables.

* * * * *